(12) United States Patent
O'Brien

(10) Patent No.: US 11,085,181 B2
(45) Date of Patent: Aug. 10, 2021

(54) STRUCTURAL MODULE TIE

(71) Applicant: SPANMINX LIMITED, London (GB)

(72) Inventor: John O'Brien, London (GB)

(73) Assignee: Spanminx Limited, London (GB)

( * ) Notice: Subject to any disclaimer, the term of this patent is extended or adjusted under 35 U.S.C. 154(b) by 0 days.

(21) Appl. No.: 16/611,385

(22) PCT Filed: May 17, 2018

(86) PCT No.: PCT/EP2018/062926
§ 371 (c)(1),
(2) Date: Nov. 6, 2019

(87) PCT Pub. No.: WO2018/224282
PCT Pub. Date: Dec. 13, 2018

(65) Prior Publication Data
US 2020/0165810 A1      May 28, 2020

Related U.S. Application Data

(63) Continuation of application No. PCT/EP2018/062926, filed on May 17, 2018.

(30) Foreign Application Priority Data

Jun. 9, 2017  (EP) .................................... 17175208

(51) Int. Cl.
*E04B 1/348*  (2006.01)
*E04B 1/58*  (2006.01)
*F16B 7/04*  (2006.01)

(52) U.S. Cl.
CPC .............. *E04B 1/3483* (2013.01); *E04B 1/58* (2013.01); *F16B 7/0433* (2013.01); *E04B 2001/5887* (2013.01)

(58) Field of Classification Search
CPC .. E04B 1/3483; E04B 1/58; E04B 2001/5887; F16B 7/0433;
(Continued)

(56) References Cited

U.S. PATENT DOCUMENTS 3,971,172 A * 7/1976 Gentil ....................... E04B 7/00
                                                        52/28
4,700,017 A * 10/1987 Morand ................... H02G 3/06
                                                        174/86

(Continued)

FOREIGN PATENT DOCUMENTS

DE    10 2005 013 090 A1    10/2006
DE    20 2011 002 862 U1     6/2012
(Continued)

OTHER PUBLICATIONS

International Search Report issued in PCT/EP2018/062926; dated Jul. 20, 2018.

*Primary Examiner* — Paola Agudelo
(74) *Attorney, Agent, or Firm* — Studebaker & Brackett PC

(57) ABSTRACT

A structural module (1) has a structural frame having structural members forming floor plates (2), wall plates (3), vertical columns (4), braces (7) extending at angles from the columns to the floor plates, and wall studs. The columns and the braces are configured to transfer vertical loads without assistance from the studs. There may be a module-to-module tie (200) affixed to at least one column, and each tie may be affixed to a top surface of a column, to link columns of adjoining modules together in a horizontal plane, and to accommodate misalignment of the modules in the horizontal plane.

19 Claims, 14 Drawing Sheets

(58) Field of Classification Search
CPC ..... Y10T 403/32549; Y10T 403/32557; Y10T 403/32591; Y10T 403/32606
USPC .......................................................... 52/79.9
See application file for complete search history.

(56) References Cited

U.S. PATENT DOCUMENTS

| | | | |
|---|---|---|---|
| 4,819,820 A * | 4/1989 | Weiner ................. | B65D 88/022 220/1.5 |
| 9,458,619 B2 | 10/2016 | Bowron et al. | |
| 9,487,351 B2 * | 11/2016 | Barnes ................. | B65D 88/022 |
| 10,053,862 B2 * | 8/2018 | Baik ....................... | E04H 1/005 |
| 2003/0006233 A1 * | 1/2003 | Reynard ............ | B65D 90/0006 220/23.4 |
| 2007/0271857 A1 * | 11/2007 | Heather ............. | B65D 90/0026 52/79.9 |
| 2012/0240482 A1 * | 9/2012 | Pitt ....................... | E04B 1/3483 52/122.1 |
| 2017/0130474 A1 * | 5/2017 | Rebollar Buldain ..... | E04H 5/02 |
| 2017/0191515 A1 * | 7/2017 | Kwon ...................... | F16B 7/185 |
| 2019/0194932 A1 * | 6/2019 | Russell ................. | E04B 1/3483 |
| 2020/0208395 A1 * | 7/2020 | Hall ........................... | E04B 1/19 |

FOREIGN PATENT DOCUMENTS

| | | |
|---|---|---|
| JP | H05-148907 A | 6/1993 |
| JP | 2015-187382 A | 10/2015 |
| WO | 2007/080561 A1 | 7/2007 |
| WO | 2011/010300 A2 | 1/2011 |

* cited by examiner

STRUCTURAL MODULE TIE

FIELD OF THE INVENTION

The invention relates to structural modules of the type described in WO2007/080561 and WO2011/010300.

There is a growing requirement in the building and construction industry to construct buildings on-site, whilst carrying out as much off-site manufacturing as possible. This is as a result of increasing demand on the construction industry, increasing labour costs, and the requirement for high rise buildings in space limited areas.

It is known to manufacture structural modules off-site, transporting them to the site, placing them one atop the other and side-by-side to provide rooms, and then erecting external cladding and a roof. Such structural modules may comprise a structural floor, load bearing walls, and a structural ceiling, arranged to support other structural modules in a multi-storey building.

WO2011/010300A2 describes how modules are tied directly to a building reinforced concrete core, such as by a tie with a head engaging behind a vertical slot in the core. However, where a module does not contact the core, it is required to be tied horizontally to another module.

The invention is directed towards providing improved load support with use of fewer structural members. Another object of the invention is to improve speed and effectiveness of inter-connection of modules when constructing a building.

SUMMARY

We describe a structural module comprising a structural frame having structural members forming:
 floor plates,
 wall plates,
 vertical columns,
 braces extending at angles from the columns to the floor plates, and
 wall studs
in which the columns and the braces are configured to transfer vertical loads without assistance from some or all of the studs.

Preferably, at least some of the columns have a box-section configuration. Preferably, the columns and the braces are joined by welding. Preferably, there is a column at each corner of the module. There may be a column at each side of a door open.

Preferably, the module further comprises a module-to-module tie affixed to at least one column.

Preferably, at least one tie is affixed to a top surface of a column, and the tie is configured to perform the function of a capping plate for interfacing with an upper module placed on the module.

Preferably, at least one tie comprises an under plate.

The tie may be adapted to link columns of adjoining modules together in a horizontal plane, and to accommodate misalignment of the modules in the horizontal plane.

Preferably, the tie comprises a pair of opposed plates each defining an enclosure accessed by a mouth, and a tie element configured to extend through said mouths and to engage said enclosures. The mouth may have an opening to allow insertion of the tie element vertically. Preferably, the tie element comprises a tie rod with sockets at each end, said sockets being configured to be inserted in the enclosures.

Preferably, the tie rod is threadably engaged with a receiver at each end, each said receiver being configured to be inserted into sockets which fit into the enclosures. The receivers may be of cylindrical shape and each configured to fit in a socket with a cylindrical axis extending vertically.

Preferably, the plate mouths are tapered to define a widening mouth towards an entrance, to allow variation in angle of entry of the tie rod into the enclosure to accommodate misalignment of the plates in the horizontal plane in use.

Preferably, the tie element comprises a spacer configured to be retained between the plates. The spacer may have a bore through which a tie rod extends.

Preferably, the spacer is configured to be fastened to at least one plate so that it may assist with withstanding tie shear forces. The spacer may comprise at least one edge configured for welding to a plate.

Preferably, the spacer comprises at least one tapered surface having an edge configured for welding to a plate. Preferably, the spacer comprises a pair of tapered surfaces in a symmetrical arrangement about the tie rod.

Preferably, at least one enclosure is arc-shaped in plan with a convex side facing the mouth.

Preferably, the tie element comprises a pair of sockets configured to be directly inserted into the enclosures, each socket having an arc-shaped portion in plan extending away from a neck portion and being configured to fit into the enclosure.

We also describe a tie for a structural module, the tie comprising components adapted to be affixed to adjoining structural modules for example tops of columns of modules, wherein the tie is adapted to link adjoining modules together in a horizontal plane, and to accommodate misalignment of the modules in the horizontal plane.

Preferably, the tie comprises a pair of opposed plates each defining an enclosure accessed by a mouth, and a tie element configured to extend through the mouths and to engage said enclosures, and wherein the mouths each have an opening to allow insertion of the tie element vertically.

Preferably, the tie element comprises a tie rod with sockets at each end, said sockets being configured to be inserted in the enclosures.

Preferably, the tie rod is threadably engaged with a receiver at each end, each said receiver being configured to be inserted into sockets which fit into the enclosures.

Preferably, the receivers are of cylindrical shape and are each configured to fit in a socket with a cylindrical axis extending vertically.

The plate mouths may be tapered to define a widening mouth towards an entrance, to allow variation in angle of entry of the tie rod into the enclosure to accommodate misalignment of the plates in the horizontal plane in use.

Preferably, the tie element comprises a spacer configured to be retained between the plates. Preferably, the spacer has a bore through which a tie rod extends.

Preferably, the spacer is configured to be fastened to at least one plate so that it may assist with withstanding tie shear forces.

The spacer may comprise at least one edge configured for welding to a plate.

Preferably, the spacer comprises at least one tapered surface having an edge configured for welding to a plate.

Preferably, the spacer comprises a pair of tapered surfaces in a symmetrical arrangement about the tie rod.

Preferably, each enclosure has an arc shape with a curve extending away from the mouth.

Preferably, each socket has an arc shaped portion in plan extending away from a neck portion configured to fit into the enclosure of the corresponding plate.

Preferably, said arc-shaped enclosure comprises a convex wall facing the mouth, and the socket has a correspondingly-shape concave side engaging said convex wall Additional Statements We describe a structural module comprising a structural frame having structural members forming:
  floor plates,
  wall plates,
  vertical columns,
  braces extending at angles from the columns to the floor plates, and
  wall studs
in which the columns and the braces are configured to transfer vertical loads without assistance from some or all of the studs.

In one embodiment, at least some of the columns have a box-section configuration. In one embodiment, the columns and the braces are joined by welding. In one embodiment, there is a column at each corner of the module. In one embodiment, there is a column at each side of a door open.

In one embodiment, the module further comprises a module-to-module tie affixed to at least one column. In one embodiment, at least one tie is affixed to a top surface of a column. In one embodiment, the tie is adapted to link columns of adjoining modules together in a horizontal plane, and to accommodate misalignment of the modules in the horizontal plane.

In one embodiment, the tie comprises a pair of opposed plates each defining an enclosure accessed by a mouth, and a tie configured to engage said enclosures.

In one embodiment, the mouth has an opening to allow insertion of a tie vertically.

In one embodiment, the tie comprises a tie rod with sockets at each end, said sockets being configured to be inserted in the enclosures. In one embodiment, the tie rod is threadably engaged with a receiver at each end, each said receiver being configured to be inserted into sockets which fit into the enclosures.

In one embodiment, the receivers are of cylindrical shape and are each configured to fit in a socket with a cylindrical axis extending vertically. In one embodiment, the plate mouths are tapered to define a widening mouth towards an entrance, to allow variation in angle of entry of the tie rod into the enclosure to accommodate misalignment of the plates in the horizontal plane in use.

In one embodiment, the tie comprises a spacer configured to be retained between the plates. In one embodiment, the spacer has a bore through which a tie rod extends.

In one embodiment, the spacer is configured to be fastened to at least one plate so that it may assist with withstanding tie shear forces.

In one embodiment, the spacer comprises at least one edge configured for welding to a plate. Preferably, the spacer comprises at least one tapered surface having an edge configured for welding to a plate.

In one embodiment, the spacer comprises a pair of tapered surfaces in a symmetrical arrangement about the tie rod.

In another aspect, we describe a tie for a structural module, the tie comprising components adapted to be affixed to adjoining structural modules for example tops of columns of modules.

In one embodiment, the tie is adapted to link adjoining modules together in a horizontal plane, and to accommodate misalignment of the modules in the horizontal plane.

In one embodiment, the tie comprises a pair of opposed plates each defining an enclosure accessed by a mouth, and a tie element configured to engage said enclosures. In one embodiment, the mouth has an opening to allow insertion of a tie element vertically.

In one embodiment, the tie element comprises a tie rod with sockets at each end, said sockets being configured to be inserted in the enclosures.

In one embodiment, the tie rod is threadably engaged with a receiver at each end, each said receiver being configured to be inserted into sockets which fit into the enclosures.

In one embodiment, the receivers are of cylindrical shape and are each configured to fit in a socket with a cylindrical axis extending vertically.

In one embodiment, the plate mouths are tapered to define a widening mouth towards an entrance, to allow variation in angle of entry of the tie rod into the enclosure to accommodate misalignment of the plates in the horizontal plane in use.

Preferably, the tie element comprises a spacer configured to be retained between the plates. The spacer may have a bore through which a tie rod extends.

In one embodiment, the spacer is configured to be fastened to at least one plate so that it may assist with withstanding tie shear forces.

In one embodiment, the spacer comprises at least one edge configured for welding to a plate.

In one embodiment, the spacer comprises at least one tapered surface having an edge configured for welding to a plate.

In one embodiment, the spacer comprises a pair of tapered surfaces in a symmetrical arrangement about the tie rod.

DETAILED DESCRIPTION OF THE INVENTION

Brief Description of the Drawings

The invention will be more clearly understood from the following description of some embodiments thereof, given by way of example only with reference to the accompanying drawings in which.

DESCRIPTION OF THE EMBODIMENTS

Figure 1:
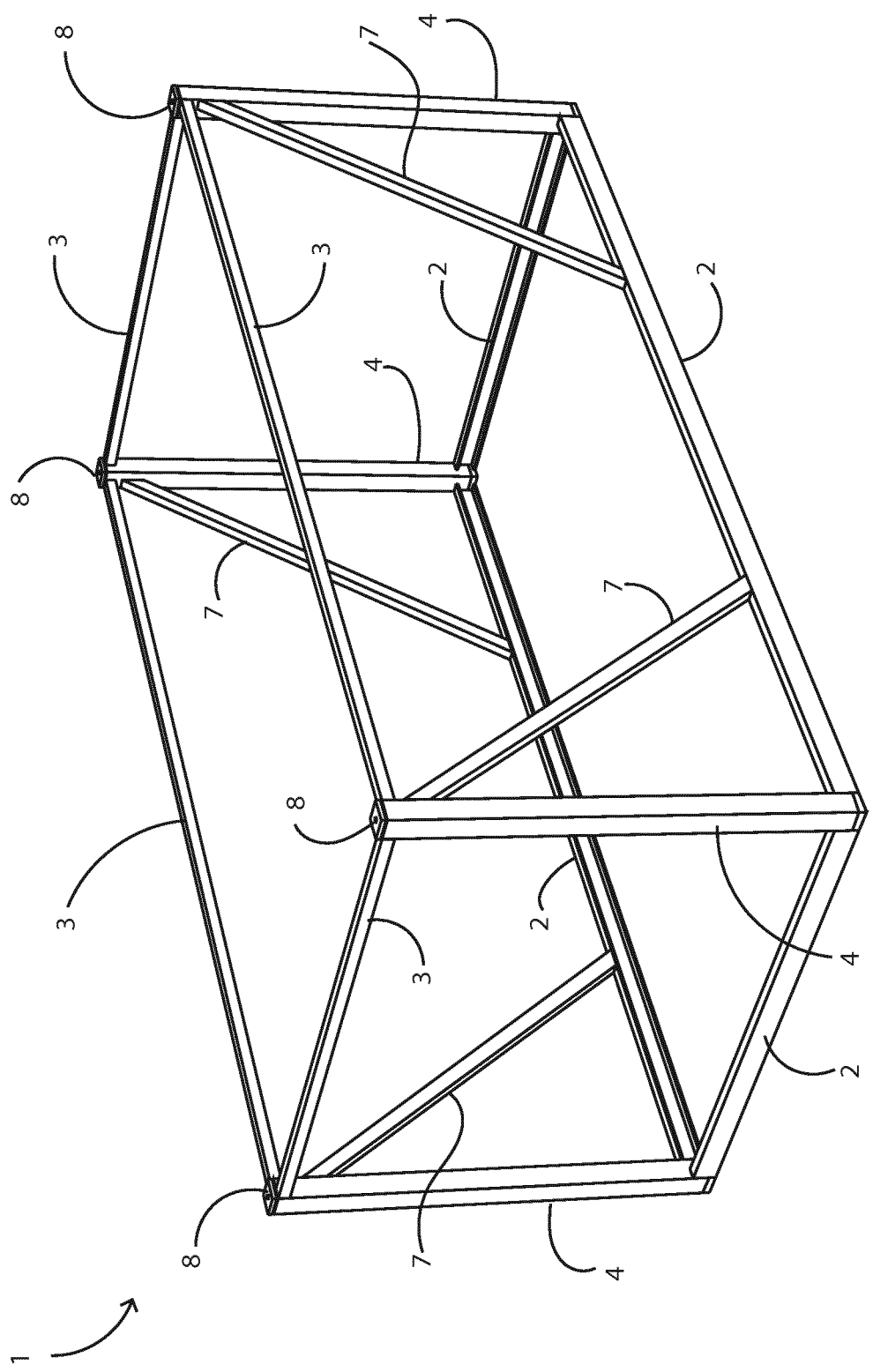
FIG. 1 is a perspective view of a load bearing, structural part of a structural module frame.

Referring to FIGS. 1 to 6 a structural module frame 1 is described. The frame 1 includes a channel-shaped floor plate 2, box-shaped wall plate 3, box-section vertical load-bearing columns 4, and channel-shaped vertical studs 6. The columns 4 are connected to the (horizontal) wall plate 3, and to box-section braces 7 extending downwards at an angle and connected to the floor plate 2.

FIG. 1 shows the major load-bearing parts of the structural module, referred to here as the structural frame. The structural columns 4 are assisted by braces 7 at corners only and on both sides of openings such as door openings. The wall plates 3 and floor plates 2 are also load bearing, due to their connections to the columns and braces. Vertical studs are not shown as these are not major load bearing parts. As can be seen in FIG. 1, the frame provides an efficient means of structural module support, whilst utilising a relatively small amount of high strength structural material.

All of the members shown are structural and are load-bearing. The studs provide minimal load-bearing strength, acting instead for providing structure of the wall panels and for fixing wall panels and retaining insulation.

The structural module also includes a structural floor and ceiling, and is finished for example in any of the manners described in WO2007/080561 and WO2011/010300. However, a major difference is that the vast majority of the vertical load is borne by the columns 4, the braces 7, the wall plates 3, and the floor plates 2. This provides for an improved way of providing vertical load support with less materials. As it is not required for the studs to be load bearing, the module is lighter.

The columns 4 may be located only at module corners, or may be at corners and on both sides of doorways or other gaps. The number and distribution of columns 4 depends on the module size and on the intended number of storeys for the building. The columns 4 also comprise lower capping plates 15, which are in line with the floor plates 2, and either a capping plate 8 or a tie 200 in line with the wall plates 3. In situations whereby a tie 200 is not required by the structure 1, a plate 8 is used instead so that there is continuity between each wall plate 3. The ties are described in more detail below with reference to FIGS. 12 to 23.

Figure 2:
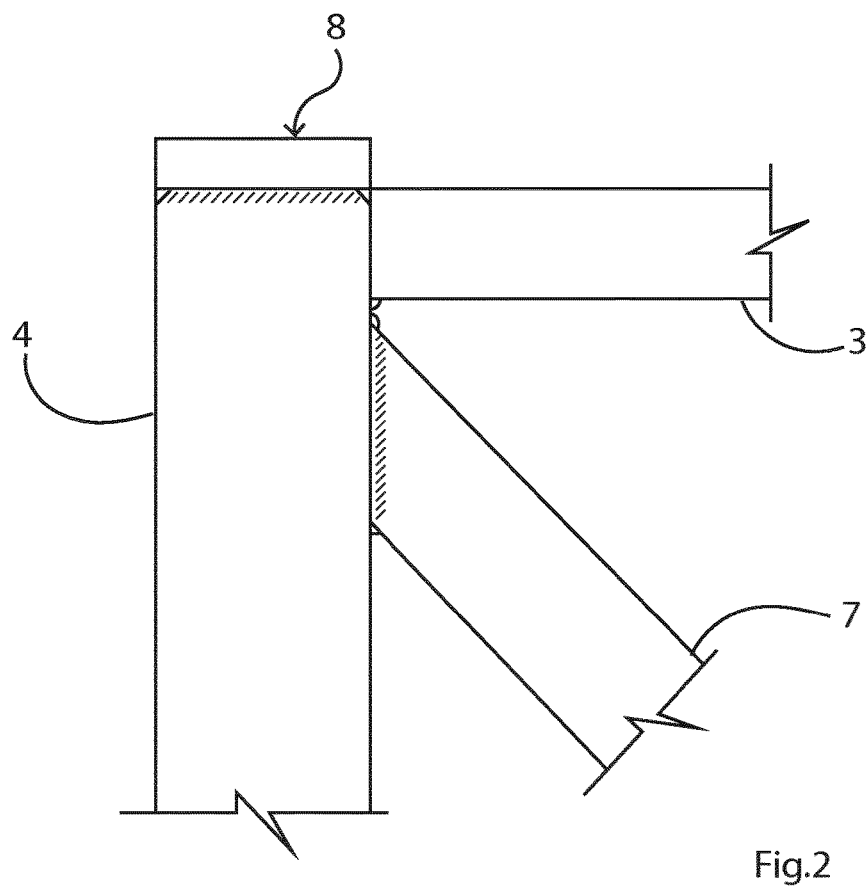
FIGS. 2 and 3 are detailed elevational views and FIG. 4 is a cross-sectional view, all showing column load-distributing structural members.
Figure 3:
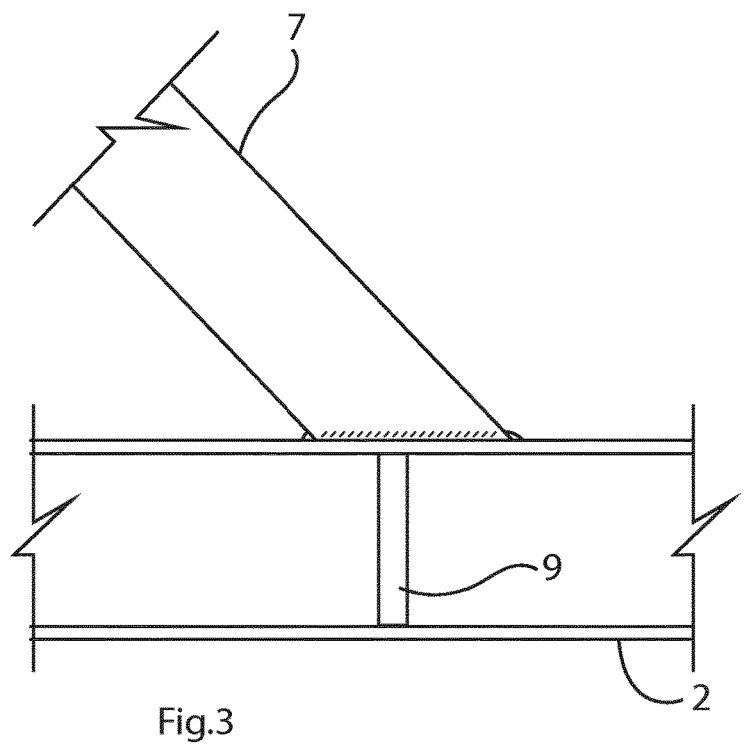
Figure 4:
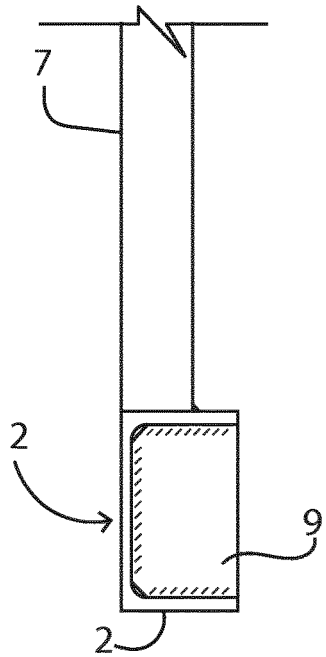

FIGS. 2 to 6 are detailed views showing the joint connections between the structural members of the module. FIGS. 2 to 4 show connection of the upper portion of the brace 7 and the lower portion of the brace 7. As can be seen, the upper portion of the brace 7 is welded to the column 4 and the lower portion is welded to the floor plate 2.

There are stiffener plates 9 welded into the floor plate 2 channel under the brace 7 joint, between the channel flanges.

Figure 5:
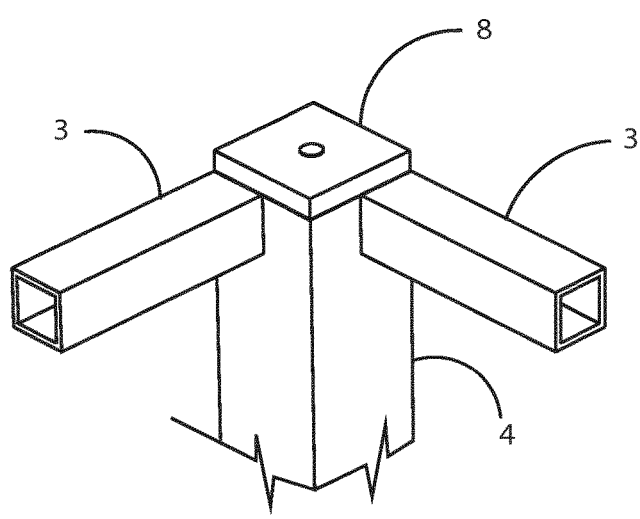
FIGS. 5 and 6 are cutaway perspectives showing corner joints of the top and bottom of the columns of the structural module frame, respectively.
Figure 6:
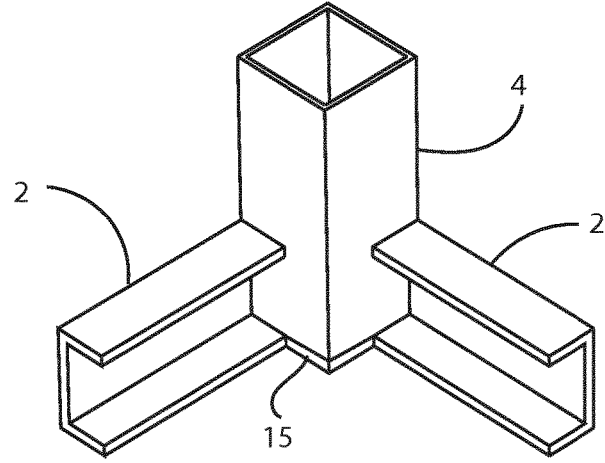

FIGS. 5 and 6 are cutaway perspective views showing corner joints of the top and bottom of the columns of the structural module, respectively. As shown in FIG. 5, the wall plates 3 are welded at the top of the column 4 and as shown in FIG. 6, the floor plates are welded at the bottom of the column 4. FIG. 6 also shows a detailed view of the cap 15 at the bottom of the column 4, in line with the lower flange of the floor plate 2.

As shown in FIGS. 2 to 6, the columns 4 and the braces 7 are box-section, although in other embodiments they may be plates or angles. The floor and wall plates 2 and 3 are channel sections and box sections respectively (or alternatively angles).

Figure 7:
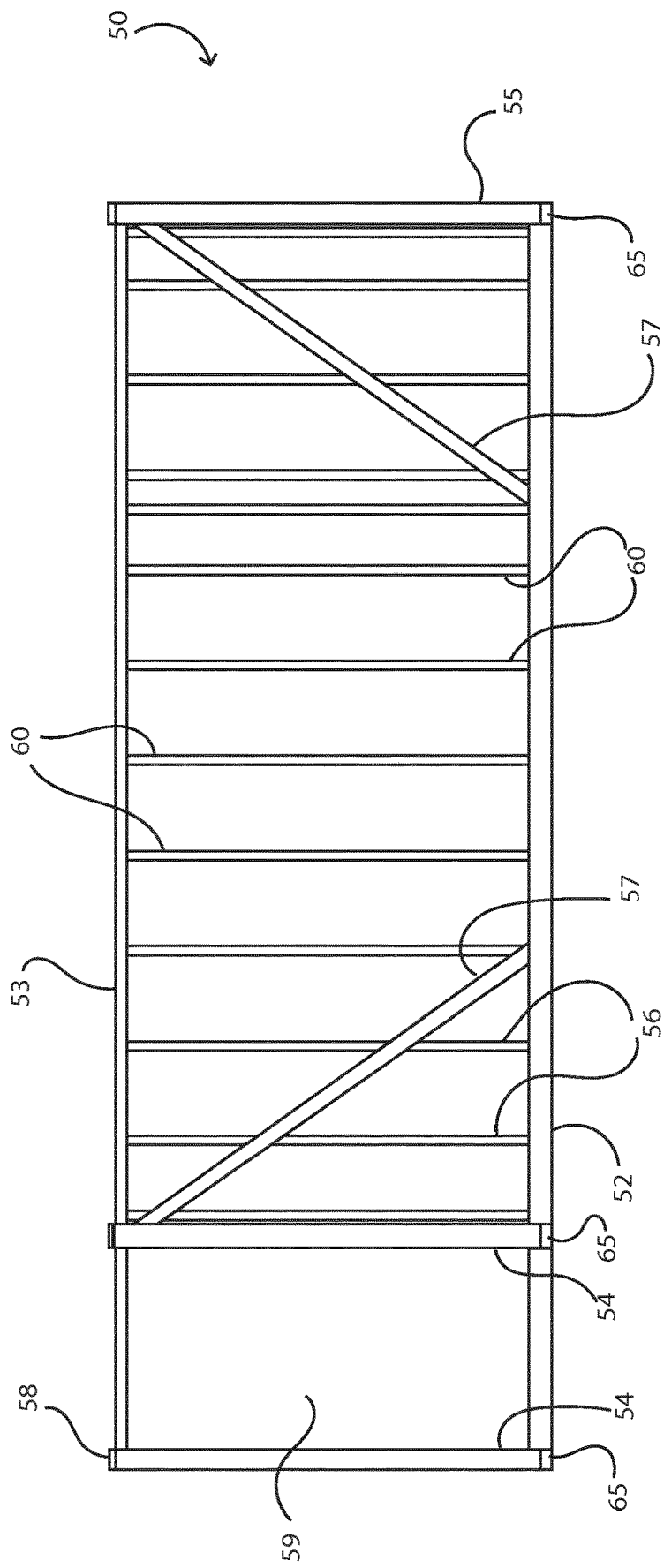
FIG. 7 is an elevational view of a load bearing, structural part of another structural module frame.

Referring to FIG. 7, another embodiment of a structural module frame 50 is shown. The module comprises a floor plate 52, a wall plate 53, vertical load-bearing columns 54, vertical studs 56, and an opening 59 for a door opening. As previously described, the columns 54 are connected to the (horizontal) wall plate 53, and to braces 57 extending downwards at an angle and connected to the floor plate 52. The vertical studs 56 are in line with the braces 57, connected above and below the braces 57, in two parts. However as previously described they are not major load bearing members of the module. As in the precious embodiments, each column 54 has either a plate 58 or a tie on the upper end and a plate 65 on the lower end.

Figure 8:
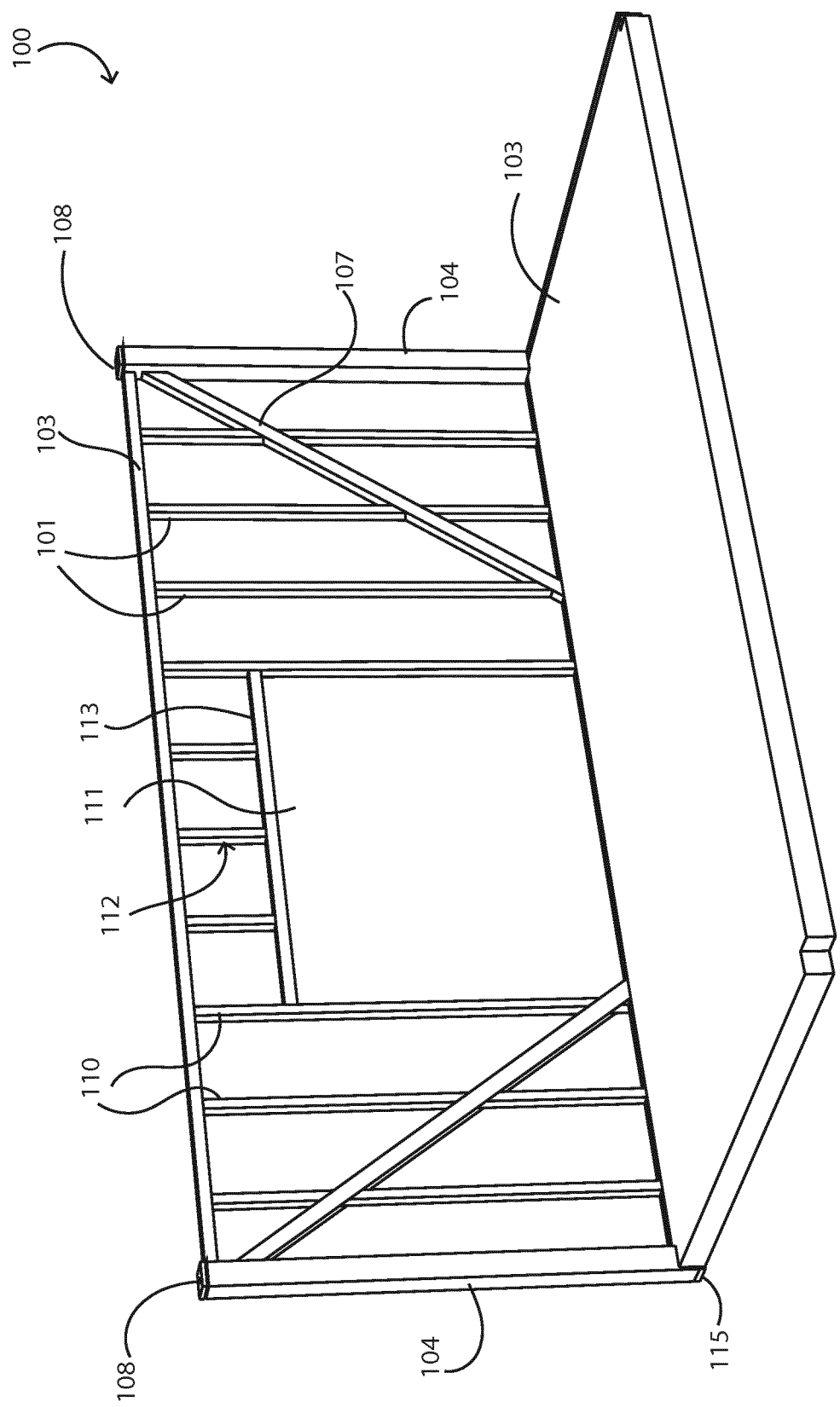
FIG. 8 is a perspective view of a load bearing, structural part of an alternative structural module frame, showing a concrete floor platform.

Referring to FIG. 8, an alternative embodiment of a structural module frame 100 is shown. The structural members of this embodiment are as previously described, however in this embodiment there is an opening 111 for a window. The opening 111 is provided by a cross member 113 and short vertical studs 112. This drawing also shows a reinforced concrete floor 103 which is also present in the other modules.

Figure 9:
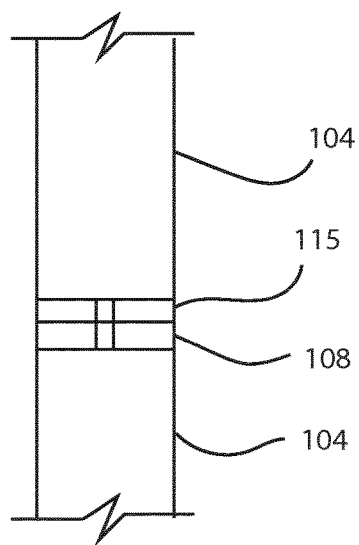
FIG. 9 is a cutaway view showing corner columns of the structural frame of a module stacked vertically and bolted together.

FIG. 9 shows corner columns 4 of the structural part of a module stacked vertically and bolted together via cap plates 108 and 115.

Figure 10:
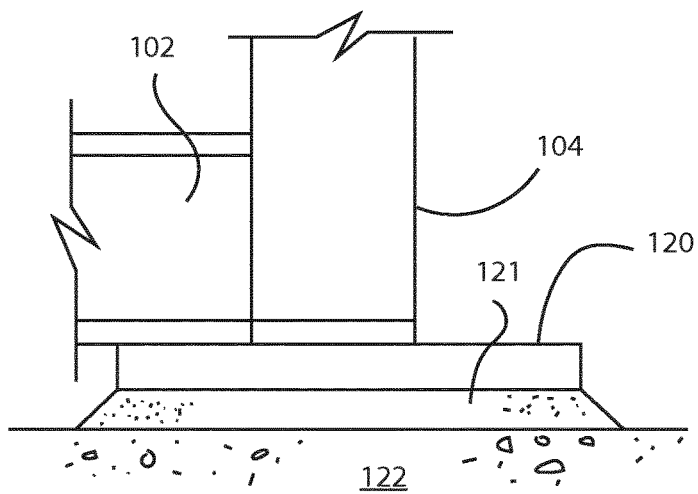
FIG. 10 is an elevational view showing a column of a module supported on a baseplate of a podium slab.

FIG. 10 shows a column 104 of the structural part of a module supported on a baseplate 120. The baseplate 120 is on top of levelling grout 121 which is on top of a base level slab. The baseplate 120 is of steel so as to provide load distribution. As can be seen, the lower flange of the floor plate 102 is in line with the base plate 120. The base level slab 122 may be a structural base for a first floor, for example, and may alternatively be referred to as a "podium slab" or a "transfer slab". The slab 122 may be supported by ground level support columns which may be of reinforced concrete. This use of a base level slab is particularly suited to the first floor of a retail or office building which may be above a parking level and as such requires higher fire ratings and reduced sound transmission.

Figure 11:
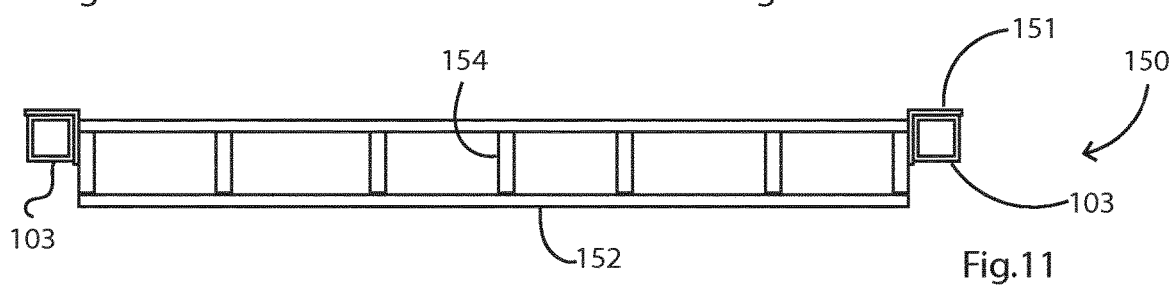
FIG. 11 shows a ceiling truss spanning two wall plates of a module.
Figure 12:
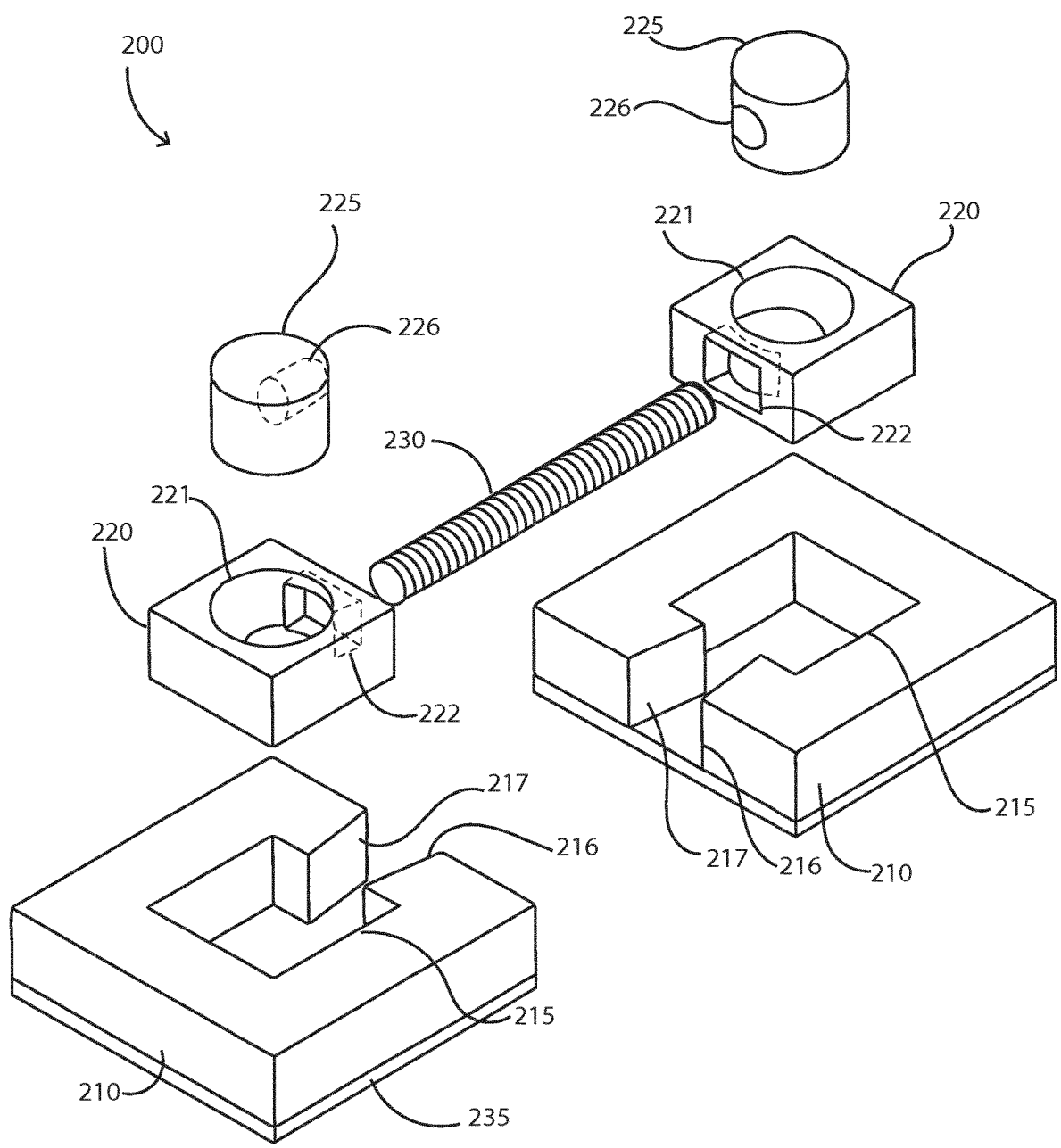
FIG. 12 is an exploded perspective view showing a tie for load-bearing columns.
Figure 13:
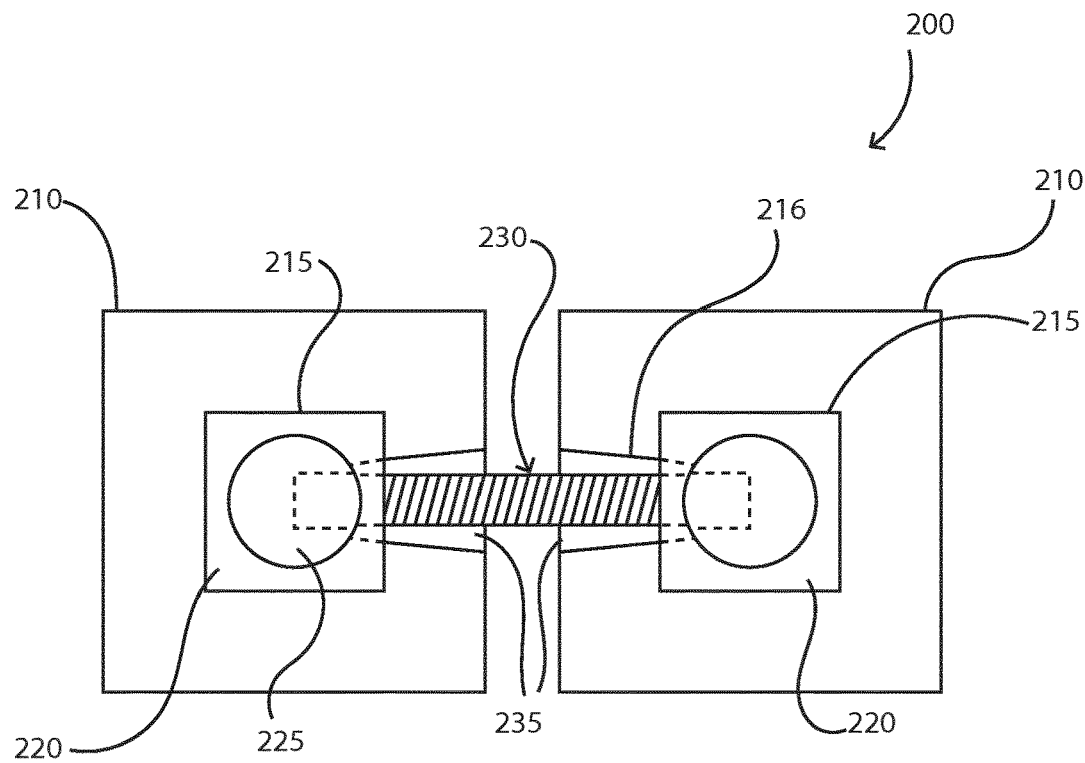
FIGS. 13 and 14 are plan and perspective views of a tie when assembled.
Figure 14:
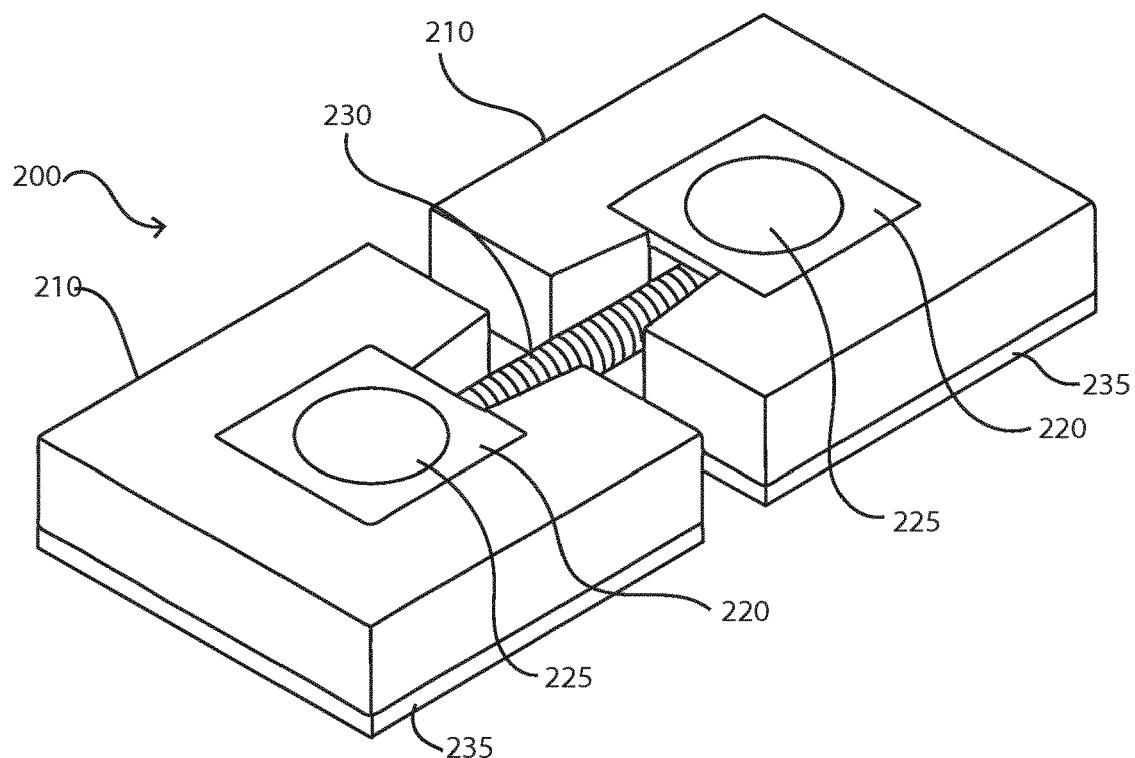
Figure 15:
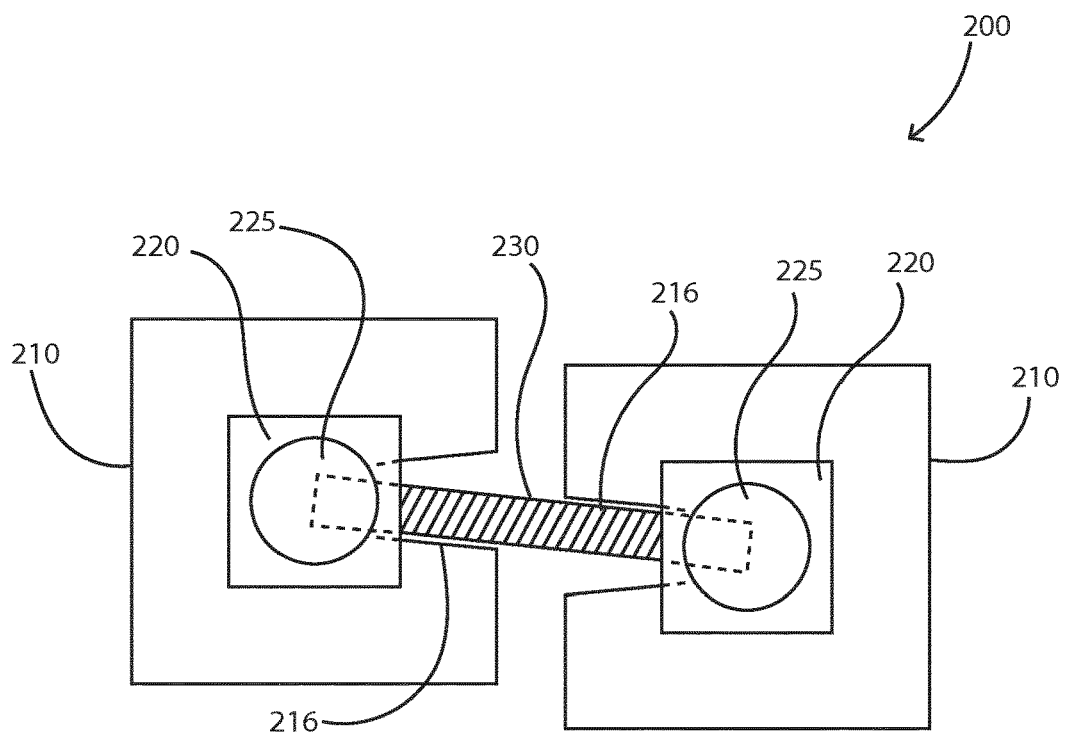
FIGS. 15 and 16 are plan and perspective views showing the assembled and installed tie when adjoining modules which are misaligned.
Figure 16:
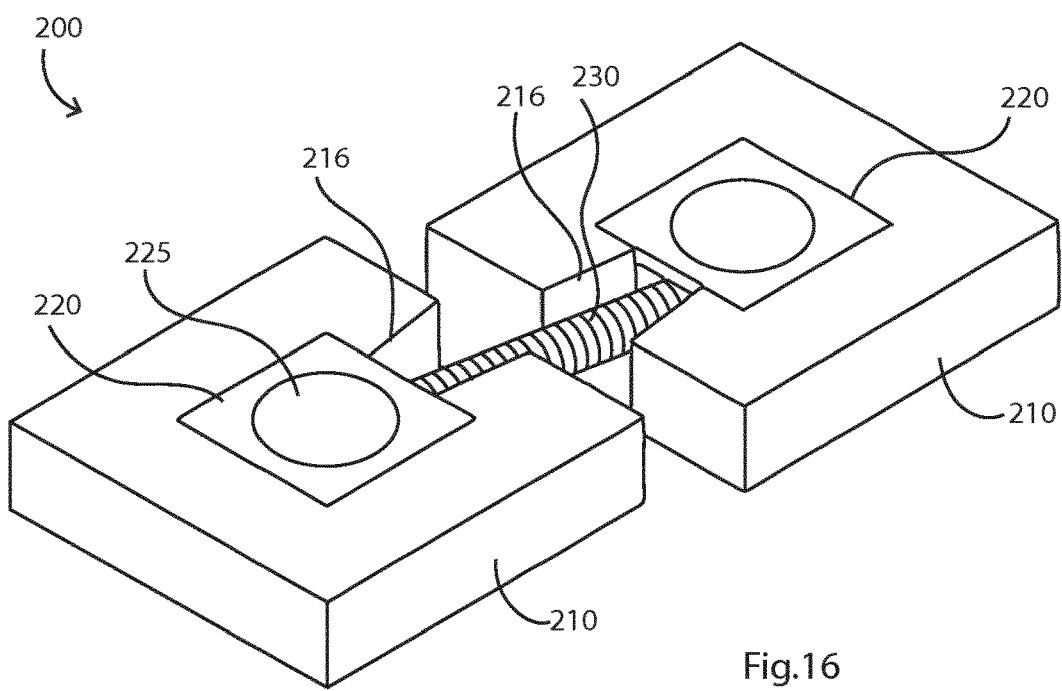

FIG. 11 shows a ceiling truss 152 which off-site is placed spanning two wall plates 153 via brackets 151. Vertical studs 154 run through the truss 152, above the ceiling and below the floor of an upper module at each end of the truss a bracket 151 engages the wall plate 153.

FIGS. 1 to 11 show structural frame aspects of structural modules. The modules also include a floor (such as shown in FIG. 9) and a ceiling (such as shown in FIG. 11) and walls including studs such as shown in FIG. 7. The walls, ceiling, and floor may be of any desired configuration.

As noted above, the columns 4 provide vertical load-bearing strength. A tie connects the columns together to transfer horizontal loads between the modules. The tie is connected to the cap plates 8/58/108 of the columns 4 and is a quick site connection with built-in tolerance for fast assembly. Some modules are tied directly to the building reinforced concrete core, such as a tie with a head engaging behind a vertical slot in the core, as is described in WO2011/010300A2. If a building only has modules tied to a core, there is no need for module-to-module horizontal ties. However, where a module does not contact the core, it is preferably if it is tied horizontally to another module. The invention describes convenient and effective tie mechanisms, as described below.

Referring to FIGS. 12 to 23, various embodiments of a tie are described. These are mounted on the columns 4 and are instead of a capping or bearing plate.

Referring to FIGS. 12 to 16, a first embodiment of a tie 200 comprises a pair of tie plates 210, each having an enclosure 215 accessed via a mouth 216 having tapered sides 217 splayed outwardly. Each tie plate 210 has an underplate 235 and is shaped to fit on top of a column 4. A pair of sockets 220 each having a square shape in plan fitting tightly into the enclosure 215, and having a cylindrical-shaped enclosure 221 on a vertical axis and accessed by a side opening 222. A pair of receivers 225, each being cylindrically shaped to fit tightly in the socket enclosure 221, and having a lateral threaded blind hole 226. A threaded rod 230, having external threads matching the internal threads of the receivers 225. The under plate 235 closes off the openings of the plate 210, so that the tie 200 is not open at the bottom.

In use, the tie plates 210 are welded to the tops of columns 4 via the under plates 235, either off-site or on-site. The rod 230, the sockets 220, and the receivers 225 are assembled and simply dropped into position into the plates 210 as shown. The mouths 216 of the plates allow the tying to take place even if the modules are misaligned to an extent allowed in individual cases by varying the tapered side 217.

It will be appreciated that integrity of the tie is not affected by minor misalignment (several mm) due to the manner in which the components fit together. An advantage of the tie is the speed of fitting and the ability for the tie to transfer horizontal loads between the modules.

Figure 17:
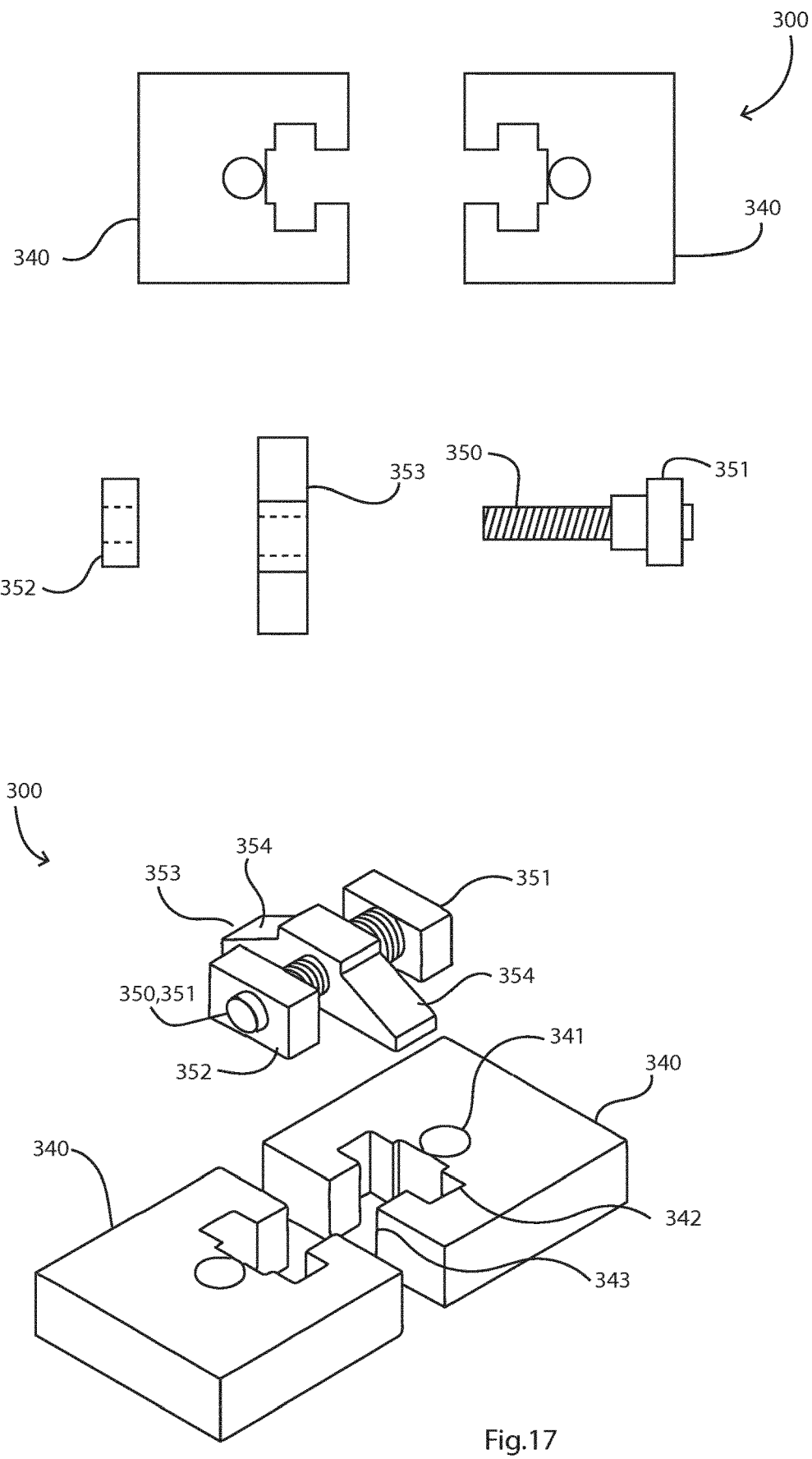
FIG. 17 is a set of views showing parts of an alternative tie, and an exploded view of the tie.
Figure 18:
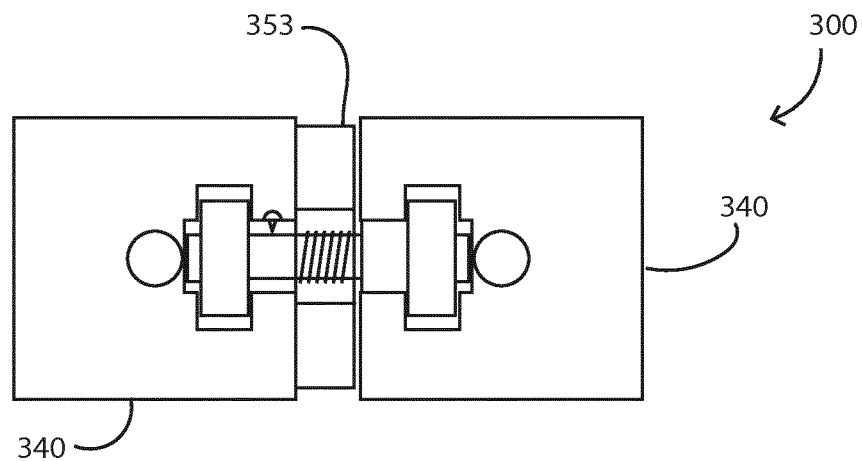
FIG. 18 is a plan and a perspective view showing the tie of FIG. 17 when assembled.
Figure 18:
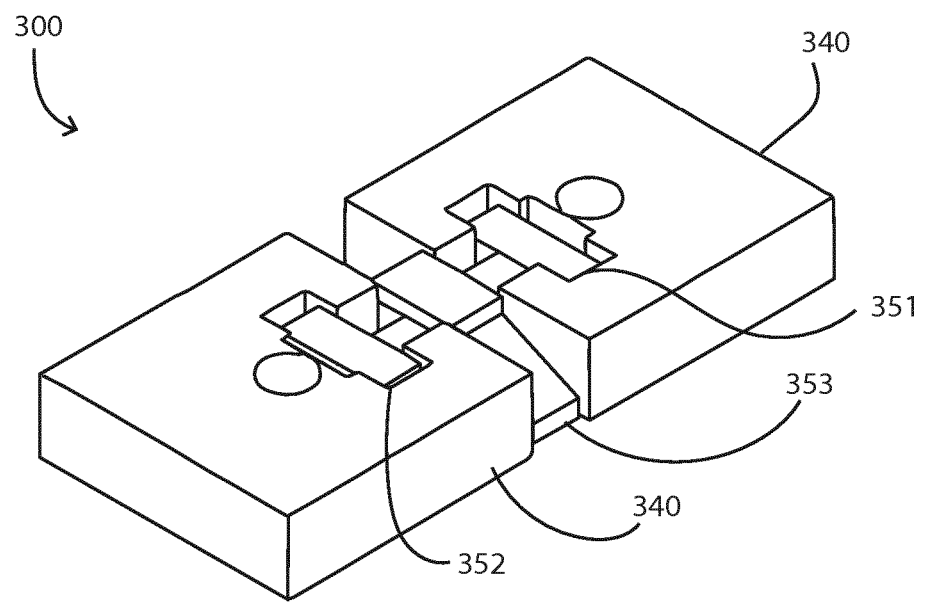
Figure 19:
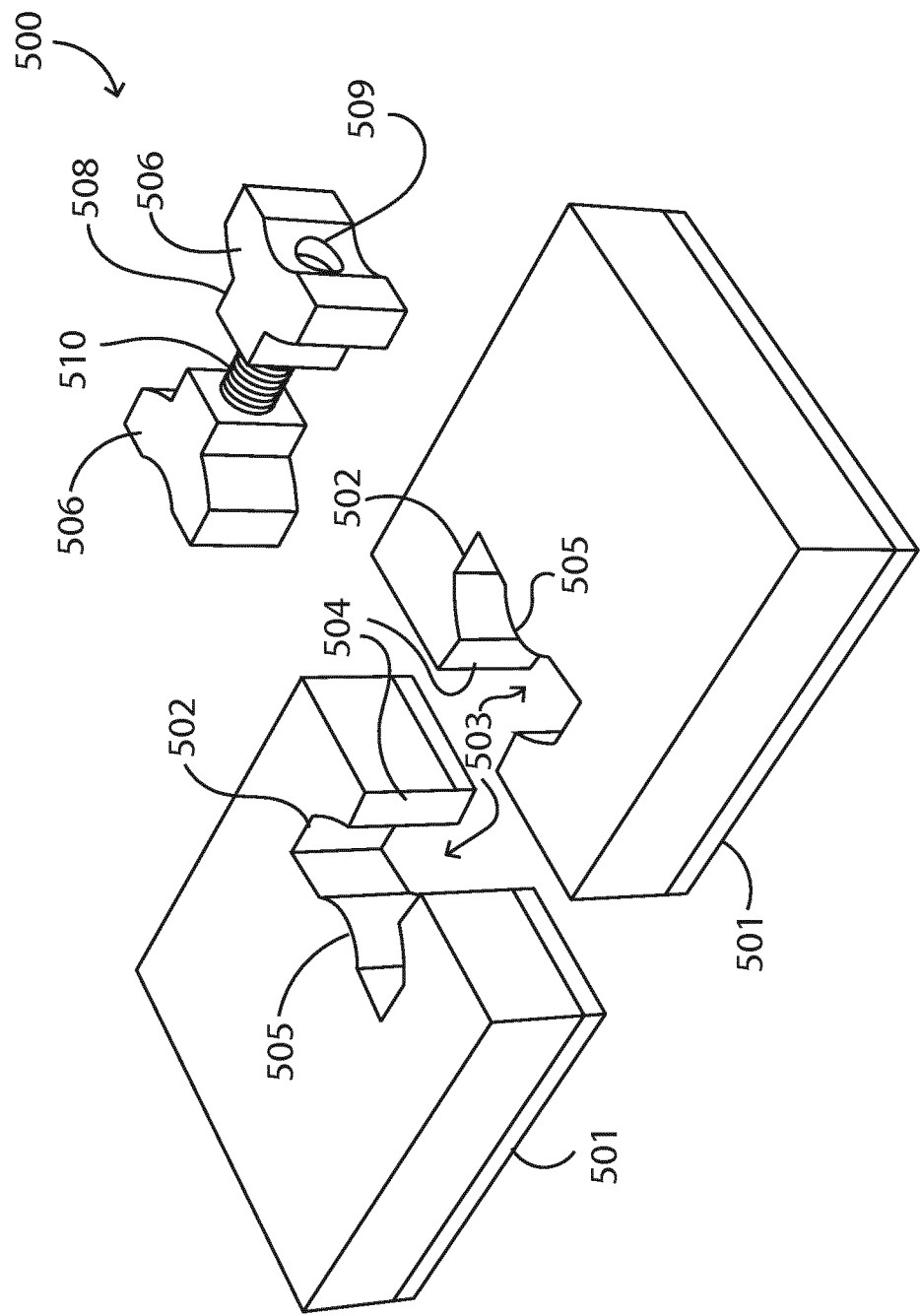
FIG. 19 is an exploded view of a tie of a further embodiment.

Referring to FIGS. 17 and 18 an alternative tie 300 comprises plates 340 with enclosures 342 accessed by mouths 343 which are also open top and bottom. However, in this case they are not tapered. A threaded rod 350 is engaged with a threaded washer 351 with a flange at one end, and at the other end with a nut 351. In-between, there is a shear plate 353 having shoulders 354 in the overall configuration of wings to the sides of the rod 350. Tolerance may be added to the system by offsetting 350 from the centre of the washer 351. Similarly to the previous embodiment, the tie 300 also comprises an under plate, not shown.

The shoulder of the shear plate 353 allows for a welded connection to one or both of the plates 340 to take the shear force from the bolt without horizontal movement. It is envisaged that a shear plate with an alternative configuration may be used, for example not having a taper, in which case the weld lines at or parallel to the corners of the plates 340.

The assembly of the components 350-354 drops into a pair of opposed plates 340, as shown in FIG. 18. The tie 300 functions similarly to the case above. The plates when positioned in two adjacent modules provide tension capacity through the bolt. When the shear plate is added the connection may also take shear.

Referring to FIGS. 19 to 23 another tie 500 is shown. The tie 500 comprises a pair of tie plates 501 each having an enclosure 502 accessed by a mouth 503 having tapered sides 504 splayed outwardly from the enclosure. Each of the tie plates 501 also comprises an under plate, not shown, as in the previous embodiments. Each enclosure 502 has an arc shape in plan with a curve extending away from the mouths 503. As in the previous embodiments, each tie plate 501 is shaped to fit on top of the column 4 and the cap plate 8.

The tie 500 further comprises a pair of sockets 506 each having an arc shape portion 507 in plan extending away from a neck 508 and configured to fit tightly into an enclosure 502 of the corresponding plate 501, which is described in more detail below.

Each socket 506 comprises a lateral threaded through hole 509 for receiving a threaded tie rod 510, the tie rod 510 having external threads engaging the internal threads of the through hole 509.

In use, the plates 501 are welded to the tops of the columns 4 via the under plates, as in the previous embodiments. The tie rod 510 is connected at both ends with the sockets 506, and as the hole 509 is a through hole, the rod can be threaded throughout the entirety of the sockets 106, or only partly, as required.

Figure 20:
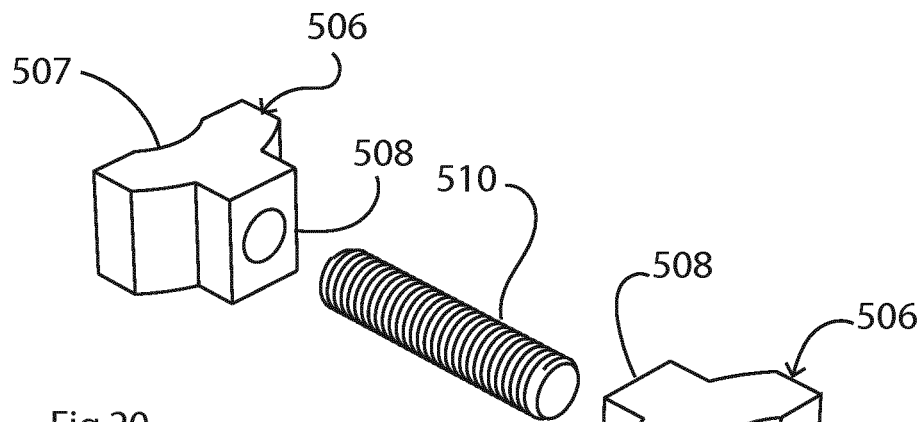
FIGS. 20, 21 and 22 are perspective views of the tie.
Figure 21:
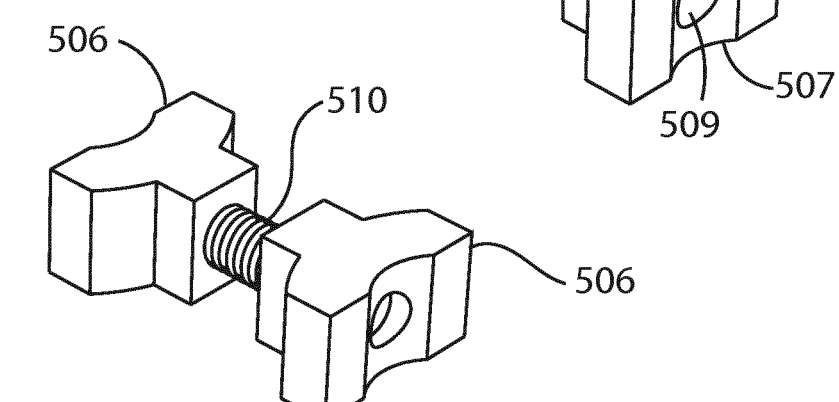
Figure 22:
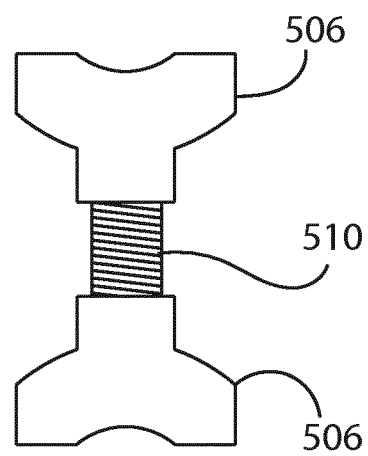

The assembly of the rod 510 and sockets 506 can be seen in FIGS. 20 to 22. Once assembled, the rod 510 and sockets 506, are placed into position in the plates 501 by vertically aligning above the plate and lowering the sockets 506, and attached rod 510, down into position in the plates 501.

Figure 23:
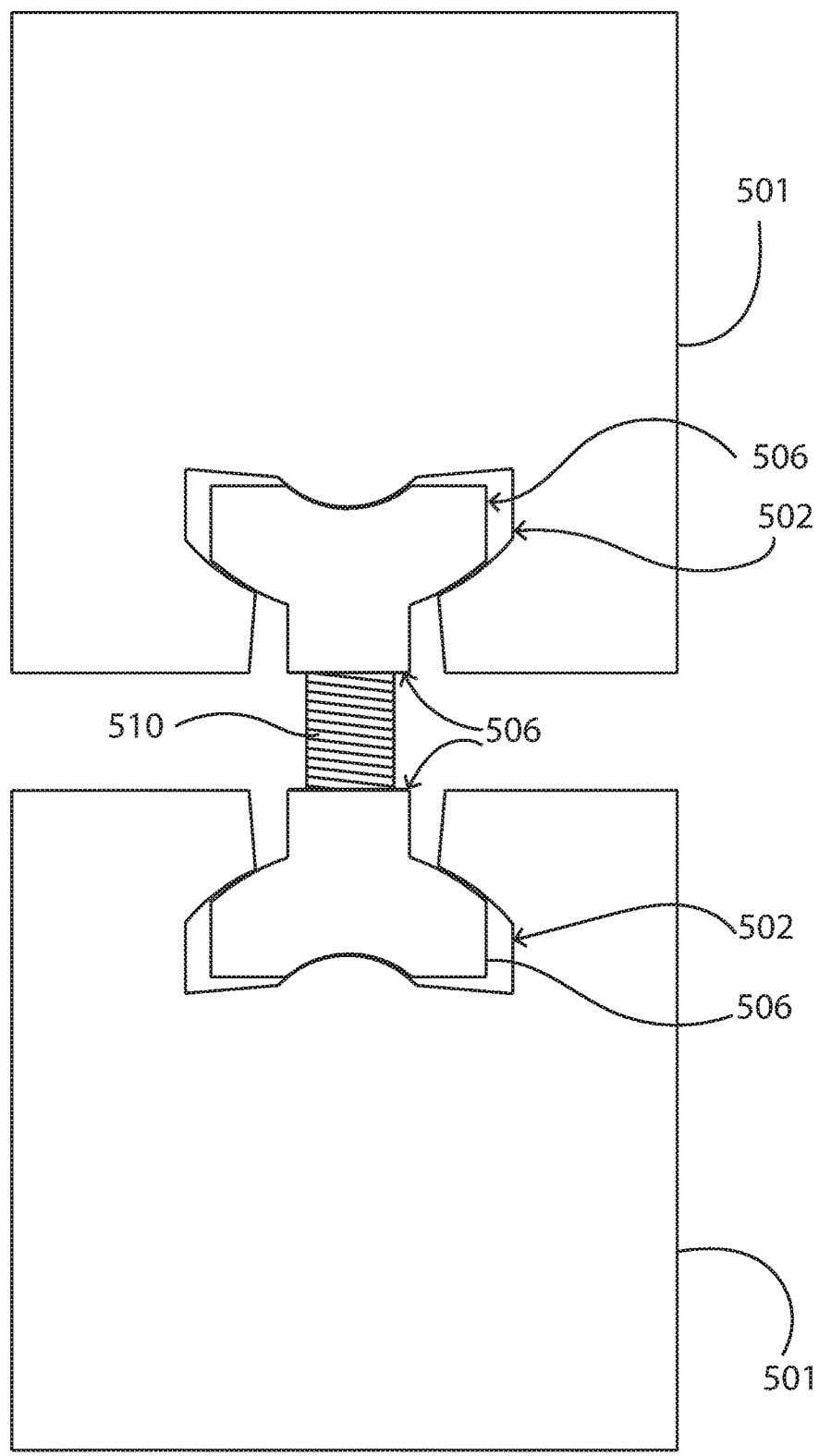
FIG. 23 is a plan view of the tie.

As can be seen in FIG. 23, the sockets 506 are placed in position within the enclosures 502 in the plates 501. Portions of the sockets 506, in particular the arced portions, are fit tightly within the enclosures 502, with preferably a gap of less than 3 mm between the edges of the sockets 506 and the enclosures 502. In contrast, there is a larger gap between the remaining portions of the sockets 506 and the edges of the enclosure, preferably a gap of at least 5 mm. Advantageously, this provides for a range of rotary movement of the socket 506 within the enclosure 502, whilst still providing for a secure and safe connection. In use, this is particularly advantageous as it allows for a margin of adjustment, in both tension and compression, to be achieved on-site.

Major advantages of the arc shaped tie are that it allows for simple and efficient assembly and allows for a margin of adjustment in both a tension and a compression capacity.

The assembly of the tie provides a secure connection between opposing columns of adjacent structural modules. The modules can be delivered and constructed on site, providing structural support by the columns at either end of the module. Following this, the assembled tie rod and sockets are lowered to the plates, providing a secure connection between the modules. Once the connection is secured, a subsequent module is placed and secured. The sequence of placing the module, manually dropping in the tie to horizontally means that a plurality of modules can be connected horizontally simply and efficiently.

Advantageously, the vertical load bearing columns and the diagonal braces provide structural support, while the vertical studs therebetween provide for requirements such as insulation and electrical cabling. This combination provides the required structural support while also allowing for an efficient use of structural space.

Advantageously, the use of the ties in combination with the structural modules allows for an efficient and secure sequence of construction of a building, whilst allowing for some customisability on-site. The simple sequence of placing the module, manually dropping in the tie to horizontally connect a plurality of modules allows for a particularly efficient procedure. The invention is particularly suited to high-rise and large-scale buildings as space and time is limited.

The invention allows for rapid assembly of components on site and their adjustment for small building tolerances, resulting in a very quick on-site connection. The connection allows for tolerance in two directions, and does not require welding or bolting beyond the details indicated here.

The invention is not limited to the embodiments described but may be varied in construction and detail. For example, the ties may be used with structural module which do not have the aspect of studs not being load bearing. Also, it is envisaged that the module may have a portion of the studs arranged to be load-bearing.

The invention claimed is:

1. A system comprising a plurality of structural modules including at least two horizontally linked modules and at least one upper module above one of said horizontally linked modules, each of said modules comprising a structural frame having structural members forming:
floor plates,
wall plates,
vertical columns,
braces extending at angles from the columns to the floor plates, and
wall studs,
in which the columns and the braces are configured to transfer vertical loads without assistance from some or all of the studs, and
at least one module-to-module tie linking said horizontally linked modules, at least one of said ties being affixed to a pair of vertical columns of said linked modules, and said tie being affixed to a top surface of a column, and being configured to perform the function of a capping plate for interfacing with the upper structural module, and
wherein the tie includes:
a pair of opposed plates each defining an enclosure accessed by a mouth, and
a tie element configured to extend through said mouths and to engage said enclosures, wherein the tie element includes a tie rod with a socket at each end, said sockets being configured to be inserted in the enclosures, and
wherein each mouth has an opening to allow vertical insertion of the tie element.

2. The structural module system as claimed in claim 1, wherein at least some of the columns have a box-section configuration, wherein the columns and the braces are joined by welding, wherein there is a column at each corner of the module, and wherein there is a column at each side of a door opening.

3. The structural module system as claimed in claim 1, wherein at least one tie includes an under plate.

4. The structural module system as claimed in claim 1, wherein the tie rod is threadably engaged with a receiver at each end, each said receiver being configured to be inserted into said sockets.

5. The structural module system as claimed in claim 1, wherein the tie rod is threadably engaged with a receiver at each end, each said receiver being configured to be inserted into one of said sockets, and wherein the receivers are of cylindrical shape and are each configured to fit in said socket with a cylindrical axis extending vertically.

6. The structural module system as claimed in claim 1, wherein the plate mouths are tapered to define a widening mouth towards an entrance, to allow variation in angle of entry of the tie element into the enclosure to accommodate misalignment of the plates in the horizontal plane in use.

7. The structural module system as claimed in claim 1, wherein the tie element includes a spacer configured to be retained between the plates, said spacer has a bore through which the tie rod extends.

8. The structural module system as claimed in claim 1, wherein the tie element includes a spacer configured to be retained between the plates, the spacer has a bore through which the tie rod extends, and wherein the spacer is configured to be fastened to at least one plate so that it may assist with withstanding tie shear forces.

9. The structural module system as claimed in claim 1, wherein the tie element includes a spacer configured to be retained between the plates, the tie element is a tie rod, the spacer has a bore through which the tie rod extends, and wherein the spacer is configured to be fastened to at least one plate so that it may assist with withstanding tie shear forces, and wherein the spacer includes a pair of tapered surfaces in a symmetrical arrangement about the tie rod.

10. The structural module system as claimed in claim 1, wherein at least one enclosure is arc-shaped in plan with a convex side facing the mouth.

11. The structural module system as claimed in claim 1, wherein at least one enclosure is arc-shaped in plan with a convex side facing the mouth, and, wherein the tie element includes a pair of sockets configured to be directly inserted into the enclosures, each socket having an arc-shaped portion in plan extending away from a neck portion and being configured to fit into the enclosure.

12. The structural module system as claimed in claim 1, wherein the tie rod is configured to threadably engage with the socket at each end of said tie rod.

13. A structural module tie for horizontally linking structural modules, the tie being adapted to be affixed to adjoining structural modules, wherein the tie is adapted to link adjoining structural modules together in a horizontal plane, the structural module tie comprising:
a pair of opposed plates each defining an enclosure accessed by a mouth, and
a tie element configured to extend through the mouths and including a tie rod with a socket at each end, said sockets being configured to be inserted in the enclosures, and wherein:
the mouths each have an opening to allow vertical insertion of the tie element, and
each said enclosure includes a convex wall facing the mouth, and each socket has a correspondingly-shaped concave side engaging said convex wall.

14. The structural module tie as claimed in claim 13, wherein the plate mouths are tapered to define a widening mouth towards an entrance, to allow variation in angle of entry of the tie rod into the enclosure to accommodate misalignment of the plates in the horizontal plane in use.

15. The structural module tie as claimed in claim 13, wherein the tie element includes a spacer configured to be retained between the plates, the spacer has a bore through which the tie rod extends, and wherein the spacer is configured to be fastened to at least one plate so that it may assist with withstanding tie shear forces.

16. The structural module tie as claimed in claim 13, wherein at least one enclosure has an arc shape with a curve extending away from the mouth.

17. The structural module tie as claimed in claim 13, wherein at least one socket has an arc-shaped portion in plan extending away from a neck portion configured to fit into the enclosure of the corresponding plate.

18. A system comprising a plurality of structural modules including at least two horizontally linked modules and at least one upper module above one of said horizontally linked modules, each of said modules comprising a structural frame having structural members forming:
floor plates,
wall plates,
vertical columns,
braces extending at angles from the columns to the floor plates, and
wall studs, in which the columns and the braces are configured to transfer vertical loads without assistance from some or all of the studs, and at least one module-to-module tie linking said horizontally linked modules, at least one of said ties being affixed to a pair of vertical columns of said linked modules, and said tie being affixed to a top surface of a column, and being configured to perform the function of a capping plate for interfacing with the upper structural module, and wherein the tie includes:

a pair of opposed plates each defining an enclosure accessed by a mouth, and a tie element configured to extend through said mouths to engage said enclosures, and wherein each mouth has an opening to allow vertical insertion of the tie element, and wherein the plate mouths are tapered to define a widening mouth towards an entrance, to allow variation in angle of entry of the tie element into the enclosure to accommodate misalignment of the plates in the horizontal plane in use.

19. A system comprising a plurality of structural modules including at least two horizontally linked modules and at least one upper module above one of said horizontally linked modules, each of said modules comprising a structural frame having structural members forming:

floor plates,
wall plates,
vertical columns,
braces extending at angles from the columns to the floor plates, and
wall studs,
in which the columns and the braces are configured to transfer vertical loads without assistance from some or all of the studs, and at least one module-to-module tie linking said horizontally linked modules, at least one of said ties being affixed to a pair of vertical columns of said linked modules, and said tie being affixed to a top surface of a column, and being configured to perform the function of a capping plate for interfacing with the upper structural module, and wherein the tie includes:

a pair of opposed plates each defining an enclosure accessed by a mouth, and a tie element configured to extend through said mouths and to engage said enclosures, and wherein each mouth has an opening to allow vertical insertion of the tie element, and wherein at least one enclosure is arc-shaped in plan with a convex side facing the mouth.

\* \* \* \* \*